(12) United States Patent
Markarian

(10) Patent No.: US 6,208,201 B1
(45) Date of Patent: Mar. 27, 2001

(54) RECOVERY OF A CARRIER SIGNAL FROM A MODULATED INPUT SIGNAL

(75) Inventor: Garegin Markarian, Eastleigh (GB)

(73) Assignee: Tandberg Television ASA, Lysaker (NO)

(*) Notice: Subject to any disclaimer, the term of this patent is extended or adjusted under 35 U.S.C. 154(b) by 0 days.

(21) Appl. No.: 09/249,936

(22) Filed: Feb. 12, 1999

(30) Foreign Application Priority Data

Feb. 28, 1998 (GB) ................................................ 9804182

(51) Int. Cl.$^7$ ............................. H04L 27/18; H04L 27/22
(52) U.S. Cl. .................... 329/308; 329/304; 375/329; 375/326; 375/327; 375/331; 375/324
(58) Field of Search ..................................... 375/326, 327, 375/331, 324, 329; 329/308, 304

(56) References Cited

FOREIGN PATENT DOCUMENTS 0 369 406 A2 5/1990 (EP).

*Primary Examiner*—Arnold Kinkead

(74) *Attorney, Agent, or Firm*—Ladas & Parry

(57) ABSTRACT

The present invention relates to the use of complex non-linear elements in improvements to the recovery of a carrier phase reference from a modulated input signal where the modulation is in accordance with the M-PSK modulation format and where M has a value greater than 4 and the signal-to-noise ratio in the channel is low. A voltage-controlled oscillator is employed to generate first and second oscillations in phase quadrature with respect to each other. The modulated input signal is mixed with the first of the oscillations to detect the (I) signal component and the modulated input signal is mixed with the second of the oscillations to detect the (Q) signal component. A control signal is derived from the (I) and (Q) signal components as an estimate of the phase difference between the input signal carrier and the voltage-controlled oscillator. The control signal conforms to the relationship:

$$a = \frac{M^2}{2^{M-1}} \sum_{K=1}^{M} (-1)^{(k-1)/2} C_M^K I^{M-K} Q^K$$

where 'a' is the control signal, 'k' is an odd integer between 1 and M, and $C_m^k$ represents binomial coefficients. The frequency of the voltage-controlled oscillator is controlled by the control signal to recover the carrier phase.

10 Claims, 5 Drawing Sheets

Carrier Recovery Technique

RECOVERY OF A CARRIER SIGNAL FROM A MODULATED INPUT SIGNAL

The present invention relates to the recovery of a carrier phase from a modulated input signal where the modulation is in accordance with the M-PSK modulation format and M has a value greater than 4. Such modulation is referred to herein as higher order M-PSK modulation.

In known art, the case of QPSK with M=4 is common, but it is not obvious from this simple case how to derive a more complex function correctly to extend the configuration of the demodulator in higher order modulation with M>4. A phase reference is required with which to perform the high order demodulation and process to do so includes a non-linear function which, in the known art of QPSK, is seen by inspection and illustrated in FIG. 1. According to the present invention the general case of the complex non-linear control signal is discovered and disclosed that applies to all values of M, including that value applicable to QPSK as a special case. Thus, the invention relates directly to identifying the non-linear functions required for the high-order case and incorporating these elements as improvements to known demodulator configurations. In the following description these functions are revealed for specific cases of high-order modulation but without limitation to their general extension.

BACKGROUND OF THE INVENTION

There are two basic approaches for dealing with carrier synchronisation at a receiver. One approach is to multiplex the modulated signal with a pilot signal and extract the pilot signal at the receiver. The extracted pilot signal is used to synchronise a local oscillator at the receiver. Another approach is to synthesize a carrier signal at the receiver by means of a phase locked loop including a voltage controlled oscillator. The control of the voltage controlled oscillator is effected by a circuit which estimates the carrier phase, the estimation being made from the input modulated signal.

The first approach has the disadvantage that the transmission bandwidth has to include provision for the pilot signal. The second approach has not been applied effectively to a receiver for higher order modulation formats.

The present invention is aimed at providing an improved method and apparatus for the recovery of a carrier phase from a signal modulated in accordance with a higher order M-PSK format.

SUMMARY OF THE INVENTION

According to the present invention there is now provided a method of recovering a carrier phase from a higher order M-PSK modulated input signal, the method comprising the steps of: employing a voltage controlled oscillator to generate first and second oscillations in phase quadrature with respect to each other; mixing the modulated input signal with the first oscillation to detect a first signal component, (I); mixing the modulated input signal with the second oscillation to detect a second signal component, (Q); deriving, from the first and second signal components, (I) and (Q), a control signal, representing the phase difference between the input signal carrier and the voltage controlled oscillator according to the relationship:

$$a = \frac{M^2}{2^{M-1}} \sum_{K=1}^{M} (-1)^{(k-1)/2} C_M^K I^{M-K} Q^K$$

where 'a' control signal, 'k' is an odd integer between 1 and M, and $C_M^k$ represent binomial coefficients; and controlling the frequency of the voltage controlled oscillator by means of the control signal to recover the carrier phase.

The invention also provides a receiver for receiving a higher order M-PSK modulated input signal, the receiver comprising: a voltage controlled oscillator to generate first and second oscillations in phase quadrature with respect to each other; a first mixer to mix the modulated input signal with the first oscillation to detect a first signal component, (I); a second mixer to mix the modulated input signal with the second oscillation to derive a second signal component, (Q); an estimator to derive, from the first and second signal components (I) and (Q), a control signal representing the phase difference between the input signal carrier and the voltage controlled oscillator according to the relationship:

$$a = \frac{M^2}{2^{M-1}} \sum_{K=1}^{M} (-1)^{(k-1)/2} C_M^K I^{M-K} Q^K$$

where 'a' is the control signal, 'k' is an odd integer between 1 and M, and $C_M^k$ represent binomial coefficients; and a control means to control the frequency of the voltage-controlled oscillator through the control signal to recover the carrier phase.

BRIEF DESCRIPTION OF THE DRAWINGS

The invention will now be described, by way of example, with reference to the accompanying drawings in which.

DETAILED DESCRIPTION OF THE INVENTION

Figure 1:
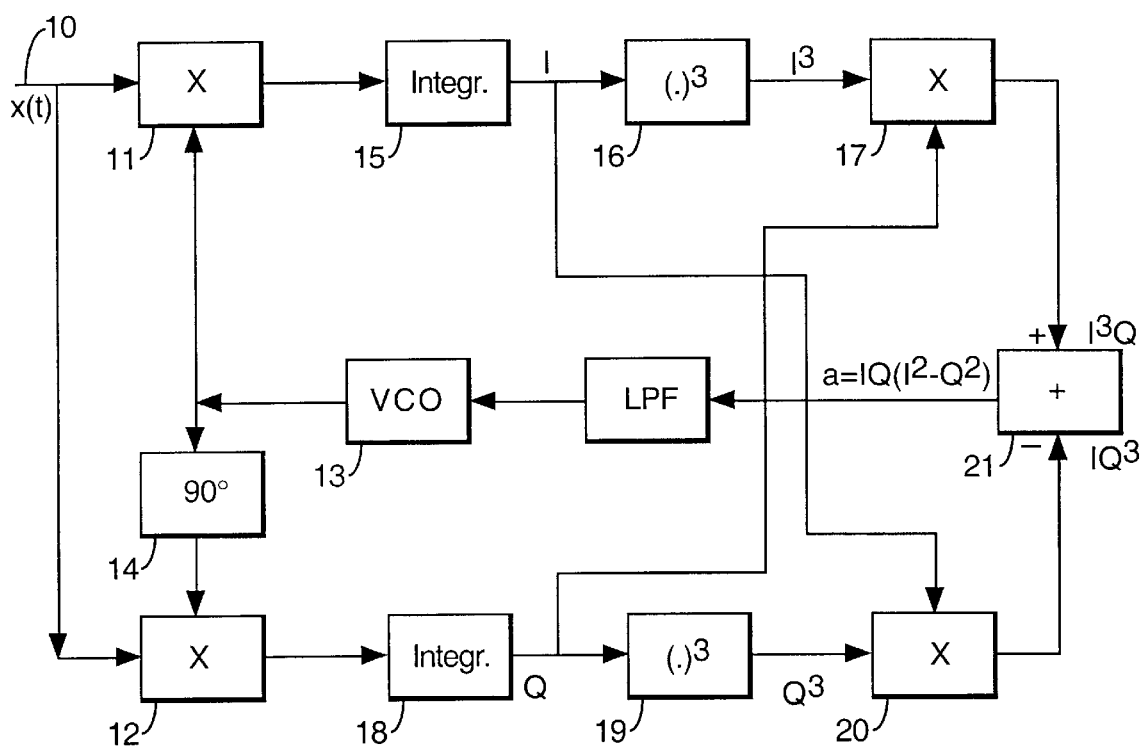
FIG. 1 shows a known carrier recovery circuit in a receiver for receiving a QPSK modulated signal.

In FIG. 1, a digital television signal, modulated in accordance with the QPSK format, is applied to an input terminal 10. The terminal 10 is connected to a first mixer 11 and a second mixer 12. The first mixer 11 is connected to receive an oscillation from a voltage-controlled oscillator (voltage controlled oscillator) 13 and the second mixer 12 is connected to receive the same oscillation from the voltage controlled oscillator 13 shifted by 90°. The 90° phase shift is performed by a phase shift circuit 14.

As is well known in the art, a QPSK modulated signal has what is referred to as an (I) component and a (Q) component. The mixer 11 detects the (I) component of the modulated input signal received at the terminal 10 while the mixer 12 detects the (Q) component of the modulated input signal. The (I) component detected by the mixer 11 is applied through an integrator 15 into an (I) component channel comprising a third order function circuit 16 and a mixer 17. The (Q) component detected by the mixer 12 is applied through an integrator 18 into a (Q) component channel comprising a third order function circuit 19 and a mixer 20. The third order function circuit 16 in the (I) component channel applies a third order function to the (I) component received from the integrator 15 to generate the quantity $I^3$. The quantity $I^3$ is received by one input of the mixer 17 from the third order function circuit 16. Another input of the mixer 17 receives the (Q) component from the integrator 18 in the (Q) channel. The mixer 17 produces an output signal representing $I^3Q$ and supplies this output to a positive input of a summing circuit 21.

The third order function circuit 19 in the (Q) component channel applies a third order function to the (Q) component received from the integrator 18 to generate the quantity $Q^3$. The quantity $Q^3$ is received by one input of the mixer 20 from the third order function circuit 19. Another input of the mixer 20 receives the (I) component from the integrator 15 in the (Q) channel. The mixer 20 produces an output signal representing $IQ^3$ and supplies this output to a negative input of the summing circuit 21.

The summing circuit 21 sums the two inputs supplied thereto to produce an output control signal representing a value 'a' where $a=IQ(I^2-Q^2)$. The control signal is applied through a low pass filter 22 to a control input of the voltage controlled oscillator 13.

Figure 5:
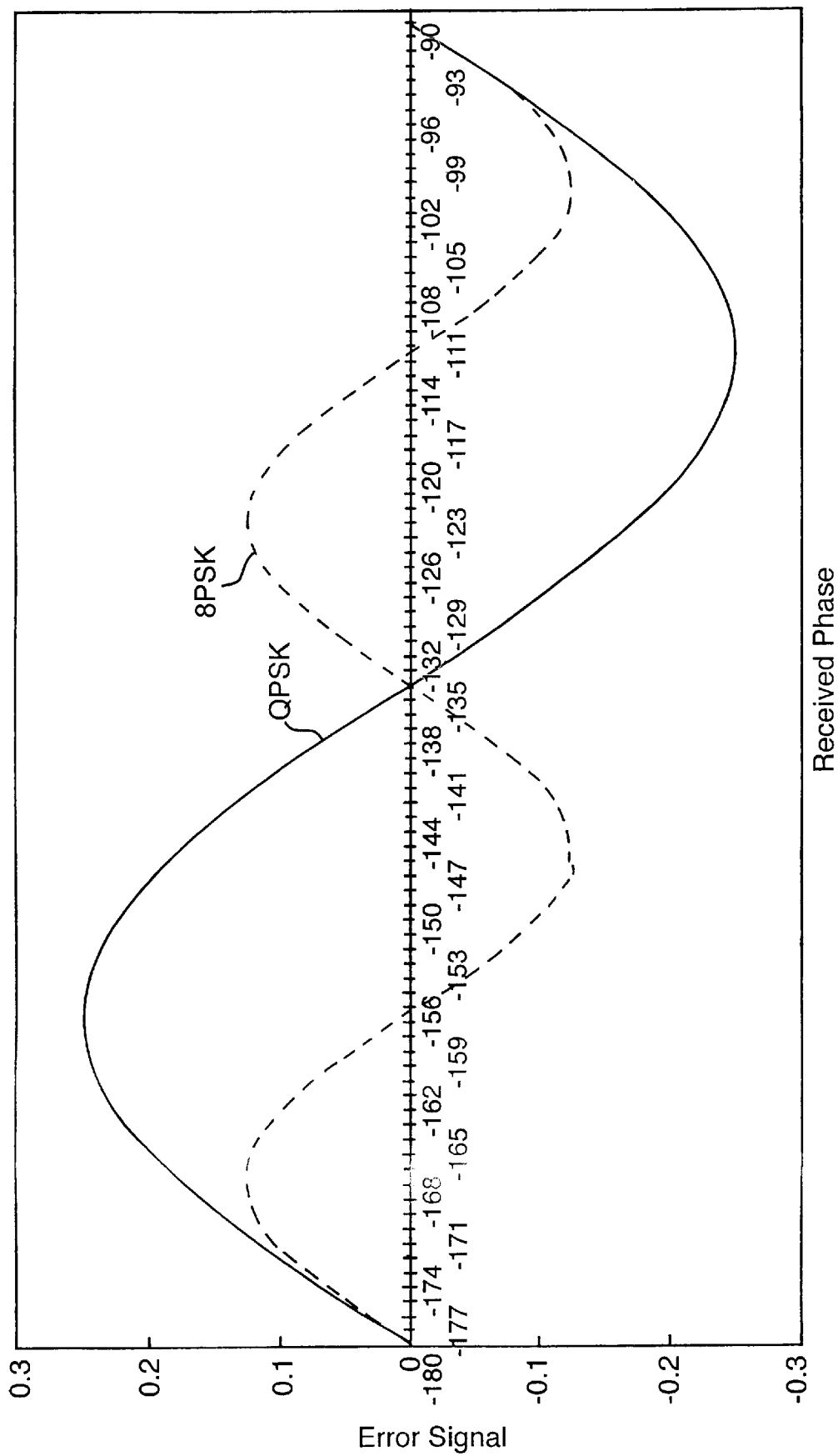
FIG. 5 is a graph showing the relation between an error controlled signal and the phase of a received modulated signal in the case of QPSK and 8PSK modulation.

It can be shown that when $(I^2-Q^2)=0$ the phase of the local oscillator 13 can be accepted as the phase of the carrier of the input signal at the terminal 10. If $(I^2-Q^2) \neq 0$ the phase of the local oscillator 13 must be altered. The control signal 'a' has a sign and magnitude representing the phase difference between the input signal carrier and the oscillation from the oscillator 13. The control signal controls the oscillator 13 to recover the carrier of the input signal. FIG. 5 shows in the full line graph the relationship between the control error signal 'a' and the phase difference.

The circuit of FIG. 1 performs a carrier recovery algorithm for a received signal modulated according to the QPSK format. It has now been discovered, according to the present invention, that the recovery algorithm applied in the circuit of FIG. 1 is a particular example of a more general recovery algorithm which can be applied to higher order phase shift key modulation under poor channel conditions (low SNR). The general recovery algorithm can be expressed as the following relationship:

$$a = \frac{M^2}{2^{M-1}} \sum_{K=1}^{M} (-1)^{(k-1)/2} C_M^K I^{M-K} Q^K \quad (1)$$

where a is the phase difference to be controlled, k is an odd integer number between 1 and M and $C_M^k$ represents binomial coefficients.

For the case of 8-PSK modulation, the relationship can be transformed to $$(I^7Q - 7I^5Q^3 + 7I^3Q^5 - IQ^7) = a \quad (2)$$

Figure 2:
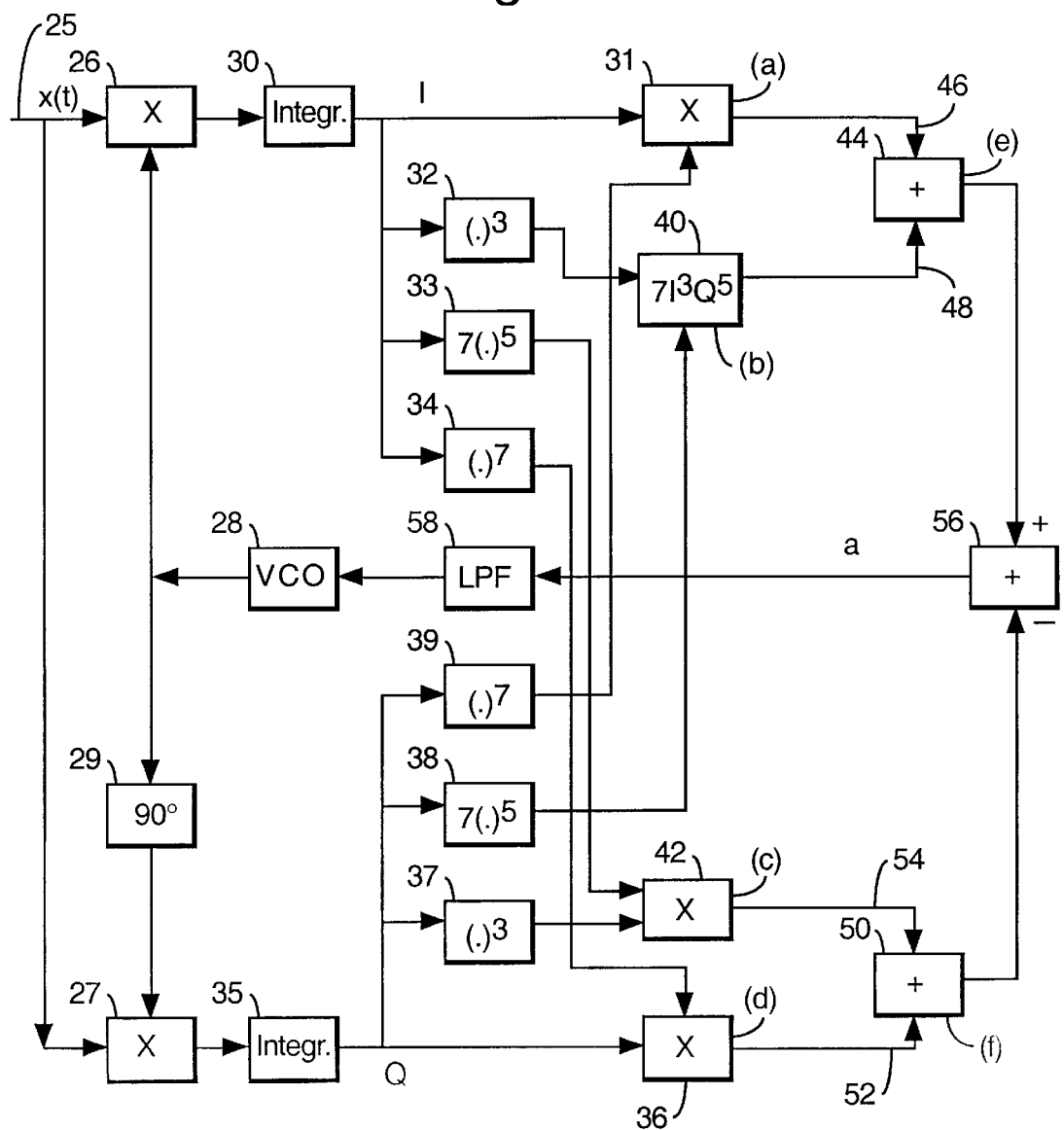
FIG. 2 shows a carrier recovery circuit, according to the present invention, for receiving an 8-PSK modulated signal.

FIG. 2 shows a carrier recovery circuit to receive an 8-PSK modulated signal at an input terminal 25. The input terminal 25 is connected to a first mixer 26 and a second mixer 27. The first mixer 26 is connected to receive an oscillation from a voltage-controlled oscillator 28 and the second mixer 27 is connected to receive the same oscillation phase shifted by 90°. The phase shift is accomplished by means of a phase shift circuit 29.

The mixer 26 detects the (I) component of the 8-PSK modulated signal and applies the detected (I) component to an integrator 30. The integrator 30 has an output connected to a mixer 31, a third order function circuit 32, a fifth order function circuit 33 and a seventh order function circuit 34.

The mixer 27 detects the (Q) component of the 8-PSK modulated signal and applies the detected (Q) component to an integrator 35. The output from the integrator 35 is connected to a mixer 36, a third order function circuit 37, a fifth order function circuit 38 and a seventh order function circuit 39.

The mixer 31 receives an output from the seventh order function circuit 39 in addition to the (I) component from the integrator 30. The seventh order function circuit 39 produces an output which represents $Q^7$ and the mixer 31 generates an output representing $IQ^7$.

The mixer 36 receives an output from the seventh order function circuit 34 in addition to the (Q) component from the integrator 35. The seventh order function circuit 34 produces an output which represents $I^7$ and the mixer 36 generates an output representing $I^7Q$.

A mixer 40 receives an input from the third order function circuit 32 and an input from the fifth order function circuit 38. The third order function circuit 32 generates a signal representing $I3$ and the fifth order function circuit 38 generates a signal representing $7IQ^5$. The mixer 40 is thus able to generate an output representing $7I^3Q^5$. A mixer 42 receives an input from the third order function circuit 37 and an input from the fifth order circuit 33. The third order circuit 37 generates a signal representing $Q^3$ and the fifth order circuit 33 generates a signal representing $7I^5$. The mixer 42 is thus enabled to generate an output signal representing $7I^5Q^3$.

The mixers 31 and 40 are each connected to supply their respective output signals to a summing circuit 44. The summing circuit 44 has a minus input terminal 46 to receive the output signal from the mixer 31 and a plus input terminal 48 to receive the output signal from the mixer 40. The result of the summation performed in the summing circuit 44 is thus an output signal representing $7I^3Q^5-IQ^7$. The mixers 36 and 42 are each connected to supply their respective output signals to a summing circuit 50. The summing circuit 50 has a plus input terminal 52 to receive the output signal from the mixer 36 and a minus input terminal 54 to receive the output signal from the mixer 42. The result of the summation performed in the summing circuit 50 is thus an output signal representing $I^7Q-7I^5Q^3$.

The summing circuits 44 and 50 are connected to supply their respective output signals to a summing circuit 56 to generate the sum: $I^7Q-7IQ^3+7I^3Q^5IQ^7$.

The sum generated by the summing circuit 56 is a control signal 'a' which represents the phase difference between the carrier phase of the input modulated signal at the input terminal 25 and the phase of the oscillation generated by the voltage controlled oscillator 28. The control signal from the summing circuit 56 is applied through a low pass filter 58 to a control input of the voltage controlled oscillator 28. The effect of the filtered control signal is to shift the phase of the oscillation generated by the voltage controlled oscillator 28 to track the carrier phase of the input modulated signal. FIG. 5 shows in the dotted line graph the relationship between the control signal 'a' and the phase difference between the carrier phase and the voltage controlled oscillator phase.

For the case of 16-PSK modulation, the equation (1) can be transformed to:

$$a_1 IQ(I^{14}-35I^{12}Q^2+273I^{10}Q^4-55I^8Q^6+55I^6Q^8-273I^4Q^{10}+35I^2Q^{12}-Q^{14})=0$$

Figure 3:
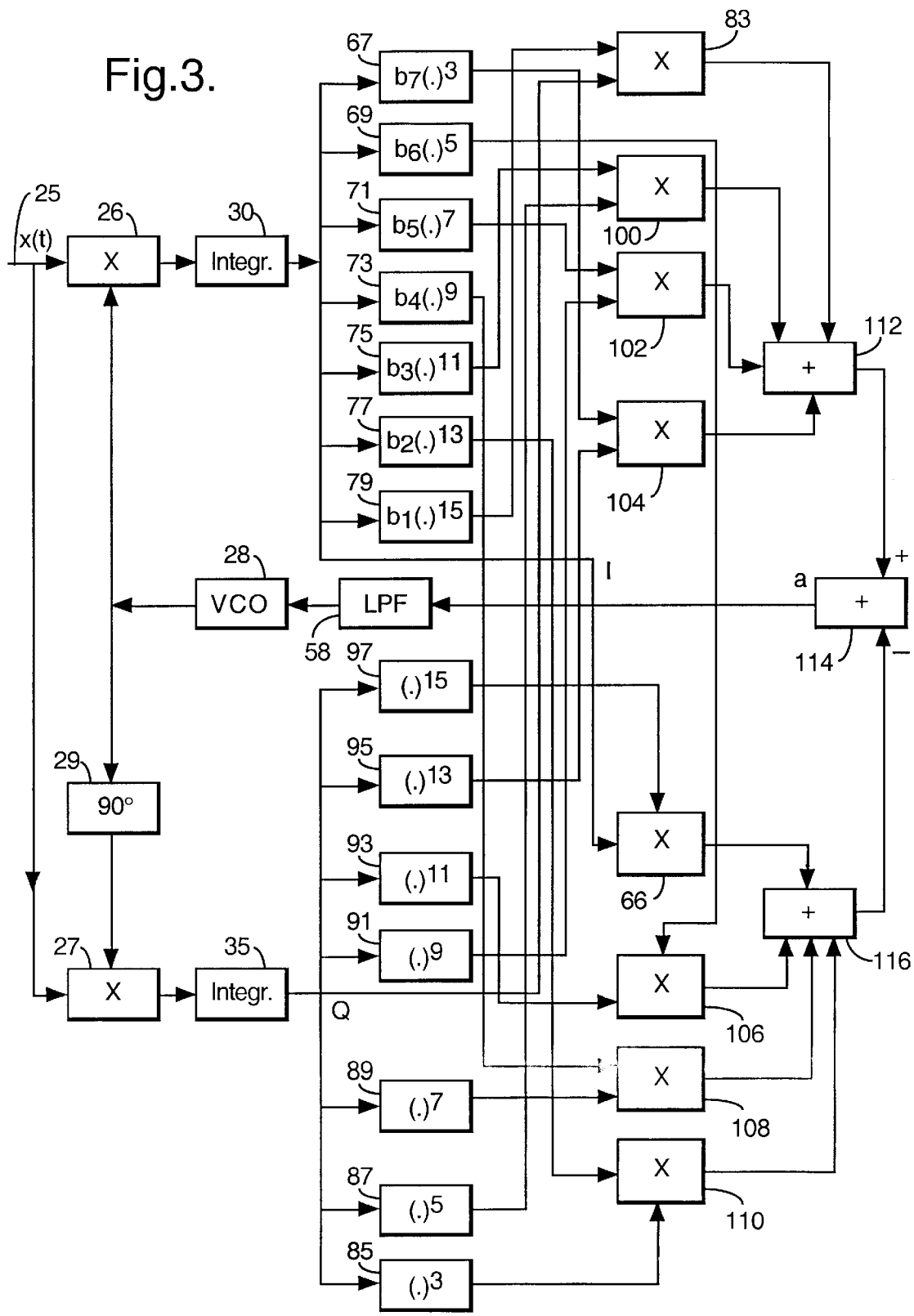
FIG. 3 shows a carrier recovery circuit, according to the present invention for receiving a 16-PSK modulated signal.

FIG. 3 shows the circuit of FIG. 2 modified to act as a carrier recovery circuit to receive a 16-PSK modulated signal at the input terminal 25. The input terminal 25 is connected to the first mixer 26 and the second mixer 27 as before. The first mixer 26 is connected to receive an oscillation from the voltage-controlled oscillator 28 and the second mixer is connected to receive the same oscillation phase shifted by 90°. The phase shift is accomplished by means of the phase shift circuit 29.

The mixer 26 detects the (I) component of the 16-PSK modulated signal and applies the detected (I) component to the integrator 30. The integrator 30 has an output connected to a mixer 66 and to a battery of function circuits 67, 69, 71, 73, 75, 77 and 79. The function circuit 67 is a third order function circuit that produces an output which represents $b_7 \cdot I^3$ where $b_7$ is a coefficient of value 273. The function circuit 69 is a fifth order function circuit that produces an output that represents $b_6 \cdot I^5$ where $b_6$ is a coefficient of value 55. The function circuit 71 is a seventh order function circuit, which produces an output, which represents $b_5 \cdot I^7$ where $b_5$ is a coefficient of value 35. The function circuit 73 is a ninth order function circuit, which produces an output, which represents $b_4 \cdot I^9$ where $b_4$ is a coefficient of value 35. The function circuit 75 is an eleventh order function circuit, which produces an output, which represents $b_3 \cdot I^{11}$ where $b_3$ is a coefficient of value 55. The function circuit 77 is a thirteenth order function circuit, which produces an output, which represents $b_2 \cdot I^{13}$ where $b_2$ is a coefficient of value 273 and the function circuit 79 is a fifteenth order function circuit that produces an output that represents $b_1 \cdot I^{15}$ where $b_1$ is a coefficient of value 1.

The mixer 27 detects the (Q) component of the 16-PSK modulated signal and applies the detected (Q) component to the integrator 35. The integrator 35 has an output connected to a mixer 83 and to a battery of seven function circuits: 85, 87, 89, 91, 93, 95 and 97. The function circuits 85 to 97 in the (Q) channel supplied by the integrator 35 correspond respectively to the function circuits 67 to 79 in the (f) channel supplied by the integrator 30. The function circuits 85 to 97 produce outputs which represent respectively the third, fifth, seventh, ninth, eleventh, thirteenth and fifteenth powers of (Q).

The mixers 100, 102, 104, 106, 108 and 110 are provided in association with the mixers 66 and 83 already referred to. The mixers 66, 83, 100, 102, 104, 106, 108 and 110 each receive a respective pair of inputs from the integrators 30 and 35, the function circuits 67 to 79 and the function circuits 85 to 97 as shown in FIG. 3.

Starting at the top of FIG. 3, two inputs applied to the mixer 83 cause the mixer 83 to generate an output signal representing $b_1 I^{15} Q$. The two inputs applied to the mixer 100 cause the mixer 100 to generate and output signal representing $b_3 I^{11} Q^5$. As will be readily appreciated from the interconnections drawn in FIG. 3, the mixers 102, 104, 66, 106, 108 and 110 generate output signals representing respectively $b_5 I^7 Q^9$, $b_7 I^3 Q^{13}$, $IQ^{15}$, $b_6 I^5 Q^{11}$, $b_4 I^9 Q^7$ and $b_2 I^{13} Q^3$.

A summing circuit 112, receivers the four output signals from the mixers 83, 100, 102 and 104 to produce a sum signal that is applied to a plus input of a summing circuit 114. A summing circuit 116 receives the four output signals from the mixers 66, 106, 108 and 110 to produce a sum signal that is applied to a minus input of the summing circuit 114. The effect of the summing circuits 112, 114 and 116 is to produce a control signal 'a' at the output from the summing circuit 114 which is representative of the sum value:

$b_1 I^{15} Q + b_3 I^{11} Q^5 + b_5 I^7 Q^9 + b_7 I^3 Q^{13} - (IQ^{15} + b_6 I^5 Q^{11} + b_4 I^9 Q^7 b_2 I^{13} Q^3)$.

The output from the summing circuit 114 can be re-written as:

$I^{15} Q - 35 I^{13} Q^3 + 273 I^{11} Q^5 - 55 I^9 Q^7 + 55 I^7 Q^9 - 273 I^5 Q^{11} + 35 I^3 Q^{13} - IQ^{15}$, where $b_1$ to $b_7$ have the values referred to above.

The output signal 'a' from the summing circuit 114 is applied through the low pass filter 58 to the control input of the Voltage controlled oscillator (voltage controlled oscillator) 28. The effect of the control signal is to shift the phase of the oscillation generated by the oscillator 28 to track the carrier phase of the input modulated signal.

What has been described with reference to FIGS. 2 and 3 are two implementations of carrier recovery circuits for 8-PSK and 16-PSK modulated signals. Each implementation uses a combination of function circuits, mixers and summing circuits to derive the control signal to control the phase of the voltage controlled oscillator 28 or 63.

The control signal in each case represents a solution to the general equation (1). It will be apparent to those skilled in the art that a solution can be found to implement a carrier recovery circuit for higher order M-PSK modulation formats where M is greater than 16. In each case the solution can be implemented by a combination of function circuits, mixers and summing circuits in a manner analogous to the implementation for 8-PSK and 16-PSK already described with reference to FIGS. 2 and 3.

For each combination of values of (I) and (Q), there is a corresponding value or coefficient for the control signal 'a'. A set of coefficients can thus be calculated for the case of 8-PSK modulation and another set of coefficients can be calculated for the case of 16-PSK modulation. In fact a set of coefficients can be calculated using the general equation (1) for any of the higher order M-PSK modulation formats.

Figure 4:
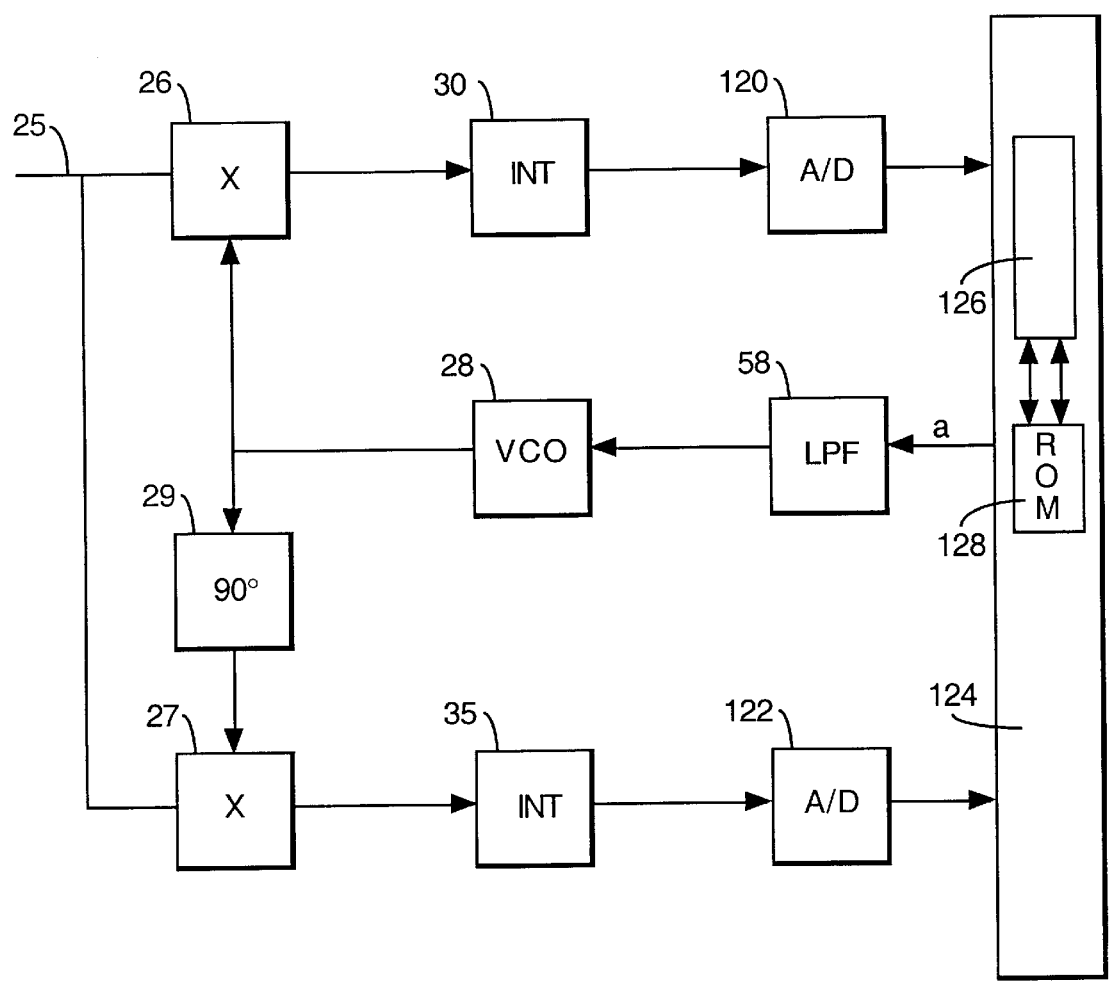
FIG. 4 shows a modification of the carrier recovery circuits of FIGS. 2 and 3.

The circuits of FIGS. 2 and 3 may be replaced by the general circuit shown in FIG. 4.

In FIG. 4 the integrator 30 of FIGS. 2 and 3 is connected to an analogue to digital converter 120, while the integrator 35 is connected to supply an analogue to digital converter 122. The analogue to digital converters 120 and 122 supply a digital processor 124 that includes an internal controller 126 and a read only memory 128. The controller is adapted to decode each digital value for the (I) and (Q) components of the input signal into co-ordinate address values for the read only memory 128. The read only memory constitutes a look up table storing coefficient values to be addressed according to the co-ordinate address values decoded by the controller 126. Thus for each digital value from the analogue to digital converter 120 the controller 126 generates a first co-ordinate address value to address the read only memory 128 and for each digital value from the analogue to digital converter 122, the controller 126 generates a second co-ordinate address value to address the read only memory 128.

The coefficients that are read from the read only memory 128 are converted by the digital processor 124 to corresponding digital values that are supplied to the low pass filter to control the oscillator 28. The phase difference between the carrier phase of the input modulated signal and the phase of the voltage controlled oscillator is represented by the control signal derived by the digital controller 124 from the stored coefficients. The control signal is applied, as before, to control the oscillator 28 and recover the carrier phase.

What is claimed is:

1. A method of recovering a carrier phase from a higher order M-PSK modulated input signal in a channel with low signal-to-noise ratio, the method comprising the steps of:

employing a voltage controlled oscillator to generate first and second oscillations in phase quadrature with respect to each other;

mixing the modulated input signal with the first oscillation to derive a first demodulated signal, (I);

mixing the modulated input signal with the second oscillation to derive a second demodulated signal, (Q);

deriving, from the first and second demodulated signals (I) and (Q), a control signal representing the phase difference between the input signal carrier and the voltage controlled oscillator according to the relationship:

$$a = \frac{M^2}{2^{M-1}} \sum_{K=1}^{M} (-1)^{(k-1)/2} C_M^K I^{M-K} Q^K$$

where 'a' is the control signal, 'k' is an odd integer between 1 and M, and $C_m^k$ represent binominal coefficients; and controlling the frequency of the voltage controlled oscillator by means of the control signal to recover the carrier phase.

2. A method as claimed in claim 1, in which the input modulated signal is an 8-PSK modulated signal, and the control signal representing the phase difference between the input signal carrier and the voltage controlled oscillator is derived according to the relationship:

$$(I^7Q - 7I^5Q^3 + 7I^3Q^5 - IQ^7) = a.$$

3. A method as claimed in claim 1, in which the input modulated signal is a 16-PSK modulated signal and the control signal representing the phase difference between the input signal carrier and the voltage controlled oscillator is derived according to the relationship:

$$a = I^{15}Q - 35I^{13}.Q^3 + 273I^{11}.Q^5 - 55I^9.Q^7 + 55I^7.Q^9 - 273I^5.Q^{11} + 35I^3.Q^{13} - I.Q^{15}.$$

4. A method as claimed in claim 1, in which the step of deriving the control signal representing the phase difference between the input signal carrier and the oscillation from the voltage controlled oscillator comprises the steps of converting the first and second demodulated signals, (I) and (Q), to digital address signals to address a look up table of coefficients and converting the addressed coefficients into the control signal.

5. A method as claimed in claim 1, in which the step of deriving the control signal representing the phase difference between the input signal carrier and the voltage controlled oscillator comprises the steps of employing a dedicated functional circuit to derive factors in the relationship and thereafter summing the factors.

6. A receiver for receiving a higher order M-PSK modulated input signal, the receiver comprising:

a voltage controlled oscillator to generate first and second oscillations in phase quadrature with respect to each other;

a first mixer to mix the modulated input signal with the first oscillation to derive a first demodulated signal, (I);

a second mixer to mix the modulated input signal with the second oscillation to derive a second demodulated signal, (Q);

processor means for deriving, from the first and second demodulated signals (I) and (Q) a control signal representing the phase difference between the input signal carrier and the voltage controlled oscillator according to the relationship:

$$a = \frac{M^2}{2^{M-1}} \sum_{K=1}^{M} (-1)^{(k-1)/2} C_M^K I^{M-K} Q^K$$

where 'a' is the control signal, 'k' is an odd integer between 1 and M, and $C_m^k$ represent binominal coefficients; and a control means to control the frequency of the voltage controlled oscillator through the control signal to recover the carrier phase.

7. A receiver as claimed in claim 6, for receiving a modulated input signal which is an 8-PSK modulated signal, wherein the processor means is adapted to derive the said control signal according to the relationship:

$$(I^7Q - 7I^5Q^3 + 7I^3Q^5 - IQ^7) = a.$$

8. A receiver as claimed in claim 6, for receiving a modulated input signal which is a 16-PSK modulated input signal, wherein the processor means is adapted to derive the control signal according to the relationship:

$$a = I^{15}Q - 35I^{13}.Q^3 + 273I^{11}.Q^5 - 55I^9.Q^7 + 55I^7.Q^9 - 273I^5.Q^{11} + 35I^3.Q^{13} - I.Q^{15}.$$

9. A receiver as claimed in claim 6, wherein the processor means includes a memory to store a look up table coefficients, analogue to digital converters to convert the first and second demodulated signals (I) and (Q) to digital address signals and a converter to convert coefficients addressed in the look up table into the control signal.

10. A receiver as claimed in claim 6, wherein the processor means includes functional circuits to derive the factors in the said relationship and summing means to sum the derived factors.

* * * * *